(12) United States Patent
Ettl

(10) Patent No.: US 10,262,791 B2
(45) Date of Patent: Apr. 16, 2019

(54) ARRANGEMENT OF SINGLE PHASE TRANSFORMERS

(71) Applicant: SIEMENS AKTIENGESELLSCHAFT, Munich (DE)

(72) Inventor: Christian Ettl, Weiz (AT)

(73) Assignee: Siemens Aktiengesellschaft, Munich (DE)

( * ) Notice: Subject to any disclaimer, the term of this patent is extended or adjusted under 35 U.S.C. 154(b) by 167 days.

(21) Appl. No.: 15/159,336

(22) Filed: May 19, 2016

(65) Prior Publication Data
US 2017/0316876 A1 Nov. 2, 2017

(30) Foreign Application Priority Data
Apr. 29, 2016 (DE) .................. 10 2016 207 425

(51) Int. Cl.
| | |
|---|---|
| *H01F 27/10* | (2006.01) |
| *H01F 30/10* | (2006.01) |
| *H01F 27/04* | (2006.01) |
| *H01F 27/06* | (2006.01) |
| *H01F 27/08* | (2006.01) |
| *H01F 27/40* | (2006.01) |
| *H02H 9/04* | (2006.01) |
| *H01F 30/12* | (2006.01) |
| *H02J 3/36* | (2006.01) |

(52) U.S. Cl.
CPC ............. *H01F 30/10* (2013.01); *H01F 27/04* (2013.01); *H01F 27/06* (2013.01); *H01F 27/08* (2013.01); *H01F 27/40* (2013.01); *H01F 30/12* (2013.01); *H02H 9/045* (2013.01); *H02J 3/36* (2013.01)

(58) Field of Classification Search
USPC ................................................ 336/55–61, 5
See application file for complete search history.

(56) References Cited

U.S. PATENT DOCUMENTS

| | | | |
|---|---|---|---|
| 3,304,359 A | 2/1967 | Sauer | |
| 3,600,597 A * | 8/1971 | Swerdlow | ............... H01F 30/10 307/17 |
| 4,092,547 A | 5/1978 | Ruppert | |

(Continued)

FOREIGN PATENT DOCUMENTS

| | | |
|---|---|---|
| CH | 427952 A | 1/1967 |
| DE | 944507 C | 6/1956 |

(Continued)

*Primary Examiner* — Elvin G Enad
*Assistant Examiner* — Kazi Hossain
(74) *Attorney, Agent, or Firm* — Laurence Greenberg; Werner Stemer; Ralph Locher

(57) ABSTRACT

A configuration for replacing a multi-phase transformer includes a plurality of single phase transformers each having a housing which is filled with an insulating fluid and in which a core with a high-voltage winding and a low-voltage winding is disposed. The configuration can be set up flexibly and also connected easily and conveniently to a supply network or consumer network by providing each housing with at least one cable connection and connecting each cable connection through a cable line to an outdoor connection which is air insulated, constructed for outdoor use and set up separately from the housing.

10 Claims, 6 Drawing Sheets

(56) References Cited

U.S. PATENT DOCUMENTS

| | | | | |
|---|---|---|---|---|
| 5,321,221 A | * | 6/1994 | Rozier | H01H 1/5833 |
| | | | | 218/2 |
| 5,841,629 A | | 11/1998 | Jeske et al. | |
| 6,894,416 B1 | * | 5/2005 | Leijon | H01F 3/10 |
| | | | | 174/DIG. 19 |
| 2001/0038290 A1 | * | 11/2001 | Coffeen | G01R 31/027 |
| | | | | 324/547 |
| 2011/0043999 A1 | * | 2/2011 | Johnston | B03C 3/68 |
| | | | | 361/699 |
| 2011/0273255 A1 | * | 11/2011 | Thompson | H01F 27/02 |
| | | | | 336/94 |
| 2011/0298287 A1 | * | 12/2011 | Cobb | H01F 27/002 |
| | | | | 307/64 |
| 2012/0021618 A1 | * | 1/2012 | Schultz | H01R 13/719 |
| | | | | 439/38 |
| 2016/0118186 A1 | * | 4/2016 | Frimpong | G01H 1/00 |
| | | | | 307/119 |

FOREIGN PATENT DOCUMENTS

| | | |
|---|---|---|
| DE | 2224541 A1 | 11/1973 |
| DE | 2421728 A1 | 11/1975 |
| DE | 19641391 C1 | 2/1998 |
| DE | 102007057017 A1 | 5/2009 |
| FR | 1202098 A | 1/1960 |
| GB | 832920 A | 4/1960 |
| JP | S5586106 A | 6/1980 |
| JP | S5957410 A | 4/1984 |
| WO | 0052799 A1 | 9/2000 |
| WO | 2009065773 A1 | 5/2009 |
| WO | 2013182227 A1 | 12/2013 |

* cited by examiner

ARRANGEMENT OF SINGLE PHASE TRANSFORMERS

BACKGROUND OF THE INVENTION

Field of the Invention

The invention relates to an arrangement for replacing a multi-phase transformer with a plurality of single phase transformers which each have a housing which can be filled with an insulating fluid and in which a core with a high-voltage winding and a low-voltage winding is arranged.

Such an arrangement is known from established practice. For example, arrangements which are composed of a plurality of single phase transformers have been described and offered. Such arrangements are used, for example, in the transmission of high-voltage direct current (HVDC), wherein the arrangement is made up of single phase transformers on the alternating voltage side of the converter.

Multi-phase, for example three-phase, transformers are usually used in alternating voltage power systems for converting an overvoltage into an under voltage, or vice versa. In this context, power transformers often reach the size of a large house. Furthermore, the transformers are adapted to the respective customer requirements, with the result that they are usually a customized one-off production. In the event of a fault, such transformers constitute a component which is critical for the safety and reliability of the supply by the power system, since in the event of a failure of the transformer the energy supply is firstly interrupted. In order to be able to replace the faulty transformer, a replacement transformer must usually be designed and manufactured at high cost. This can give rise to delays of more than 1 year. Therefore, as an intermediate solution the faulty transformer is replaced only on a temporary basis by a replacement transformer which is already available and can be used in a flexible way. However, owing to the large weight and size of said replacement transformer, its transportation is time-consuming and can take several weeks, depending on the weather conditions. Further delays occur in situ owing to the long installation times or commissioning times.

BRIEF SUMMARY OF THE INVENTION

The object of the invention is therefore to make available an arrangement of the type mentioned at the beginning which can both be set up in a flexible way and also connected easily and conveniently to a supply power system or consumer power system.

The invention solves this problem in that each housing has at least one cable connection and each cable connection is connected via a cable line to an outdoor connection which is set up separately from the housing.

Within the scope of the invention, cable connections are provided for connecting a consumer power system or supply power system. In other words, each single phase transformer has a housing with at least one cable connection. Each cable connection is connected within the scope of the invention via a cable line to an outdoor connection which is set up separately from the housing. A cable line or, in other words, cable connection comprises one or more cable conductors. A cable conductor has at least one internal conductor which is surrounded on the outside by an electrically insulating solid. The internal conductor or conductors is/are fabricated from an electrically conductive material, for example an appropriate metal or a metallic alloy. The outdoor connection then serves to connect a phase of a supply power system or consumer power system. The outdoor connection is therefore designed as a high-voltage connection and can be set up where the connection to a phase of a power system can take place quickly and cost-effectively and where there is sufficient space. Owing to the cable connection between the outdoor connection and the transformer housing, there is no need for minimum distances to be maintained between the high-voltage conductors and the components at ground potential. The externally insulated cable conductors of the cable line can, in other words, be laid as desired over the terrain.

When the arrangement according to the invention is commissioned, it is to be assumed that the single phase transformers do not have to be set up one next to the other but are instead distributed over a relatively large area. In previous solutions, the commissioning was delayed, since the power system lines had to be connected in a comparatively costly fashion to the connection leadthroughs of the single phase transformers which are arranged in a distributed fashion. This is avoided within the scope of the invention.

The cable line advantageously has at least one cable conductor, wherein each cable conductor has a length between 5 and 50 meters. In this variant of the invention, the cable conductors are arranged, for example, on cable drums. Each cable drum preferably has a cable conductor with a length between 20 and 40 meters. The cable drums can be kept available for use on demand. Flexible adaptation of the arrangement is therefore made possible.

According to one preferred configuration of the invention, each housing is equipped with two cable connections. Since two cable connections are provided, each housing can be connected to the outdoor connection via two cable conductors. The cable line is therefore of redundant design. In the case of a cable fault in a cable conductor, the connection between the outdoor connection and the transformer is therefore made by the respective other cable conductor, and the energy supply can therefore be maintained. Furthermore, two cable conductors have relatively large current carrying capacity. The current and therefore the power to be transmitted can therefore be increased.

According to one development which is expedient in this regard, each outdoor connection is equipped with two cable inputs.

In a further advantageous embodiment of the invention, each outdoor connection has an under frame for placing the outdoor connection on the ground, and a busbar for connecting a phase of a consumer network or supply network, wherein the busbar is supported in an insulated fashion on the under frame by means of at least one support. Such a configuration of the outdoor connection simplifies the commissioning even further. The outdoor connection can easily be set up at any desired locations on the ground, for example next to the outdoor connection of another single phase transformer. The support makes available the necessary insulation between the busbar which is at a high voltage during operation and the under frame which is at ground potential.

According to a development in this regard, an overvoltage arrester is connected between the busbar and the under frame. Overvoltage arresters are distinguished by a nonlinear resistance which is connected between its two connections. During normal operation, the resistance of the overvoltage arrester is very high. However, if the voltage applied to its connections exceeds a previously defined threshold value, the nonlinear resistance becomes conductive, with the result that the overvoltage arrester bypasses the components which are connected in parallel with it. The overvoltage arrester therefore protects, for example, the low-voltage winding of the transformer.

In a further embodiment of the arrangement according to the invention, at least one closable adjustment opening is formed in the housing and provides access to a selection device arranged in the housing, wherein the selection device forms a plurality of voltage connections which are each connected to an associated lead through plug-in bushing, a cable connection or a winding, wherein two of the voltage connections can be optionally connected to one another via a switching unit. According to this advantageous development of the invention, the single phase transformers can be set to specific inputs or outputs. For this purpose, a voltage connection of each selection device is connected to a winding. The remaining connections of the respective selection unit are connected to an assigned lead through plug-in bushing or a cable connection. The winding is connected to the selected input or output by means of the switching unit. The switching unit is, for example, an appropriately embodied switch or a connection conductor which can be plugged more cost-effectively on both sides onto the voltage connections and is referred to below as an actuation conductor. By simply reconnecting the actuation conductor it is possible to connect said winding to another lead through plug-in bushing. The inputs and outputs can therefore be set in a flexible way. The selection device is arranged within the housing and therefore is completely surrounded by insulation fluid during the operation of the arrangement. However, it directly faces an adjustment opening of the housing. This adjustment opening is preferably located in what is referred to as the cover of the housing. In order to connect, for example, a certain lead through plug-in bushing, which is configured for a relatively high voltage, to the high-voltage winding, the insulation fluid is let out of the housing to a certain extent, and access to the selection device via the adjustment opening is therefore made possible for a user. Subsequently, the actuation conductor can be plugged on to the corresponding voltage connections of the selection device in such a way that the desired lead through plug-in bushing is connected to the high-voltage winding.

According to a further development which is appropriate in this regard, an input adjustment opening and an output adjustment opening are provided, wherein the selection device which faces the input adjustment opening is connected to a high-voltage winding, and at least two lead through plug-in bushings and the selection device, facing the output adjustment opening, is connected to a low-voltage winding, a further lead through plug-in bushing or to one or each cable connection. In other words, the arrangement according to the invention can therefore be made more resilient with respect to specific input voltages, wherein, furthermore, the voltage of the low-voltage winding can be applied to various outputs or vice versa. For example, the low-voltage winding can optionally be connected to a high-voltage lead through or else to one cable connection or to each cable connection via the output adjustment opening.

Furthermore, it is advantageous if each housing of a single phase transformer is detachably connected to a cooling module which can be set up separately, a separately set-up expansion vessel, plug-in high-voltage leadthroughs and an auxiliary power module. In other words, within the scope of this further development of the invention, each single phase transformer is of modular design. The transportation capability of the arrangement according to the invention is therefore improved, and the commissioning thereof speeded up, by means of this modular design.

BRIEF DESCRIPTION OF THE SEVERAL VIEWS OF THE DRAWING

Further expedient configurations and advantages of the invention are the subject matter of the following description of exemplary embodiments of the invention with respect to the figures of the drawing, wherein identical reference symbols refer to identically acting components, and wherein.

DESCRIPTION OF THE INVENTION

Figure 1:
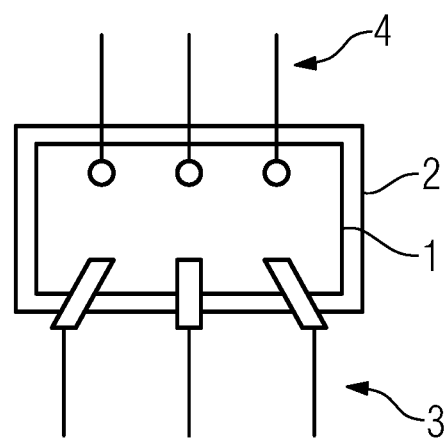
FIG. 1 shows a schematic view of a faulty multi-phase transformer.

FIG. 1 shows a plan view of a three-phase transformer 1 which is arranged on a base 2 made of concrete. On the overvoltage side, the transformer 1 is connected to a high-voltage supply power system 3 which has three phases. On the under voltage side, a consumer power system 4, which also has three phases, is connected. In the event of the failure of the multi-phase transformer 1, the energy supply of the consumer power system 4 cannot be maintained by the supply power system 3. Therefore, it is necessary to ensure the rapid replacement of the multi-phase transformer 1. However, the multi-phase transformer 1 is a power transformer and is configured for high voltages, and it therefore usually takes several months, for example 10 to 15 months, to produce it individually. The transportation of a multi-phase replacement transformer is also lengthy. In addition, the commissioning of previously known transformers can take several weeks.

Figure 2:
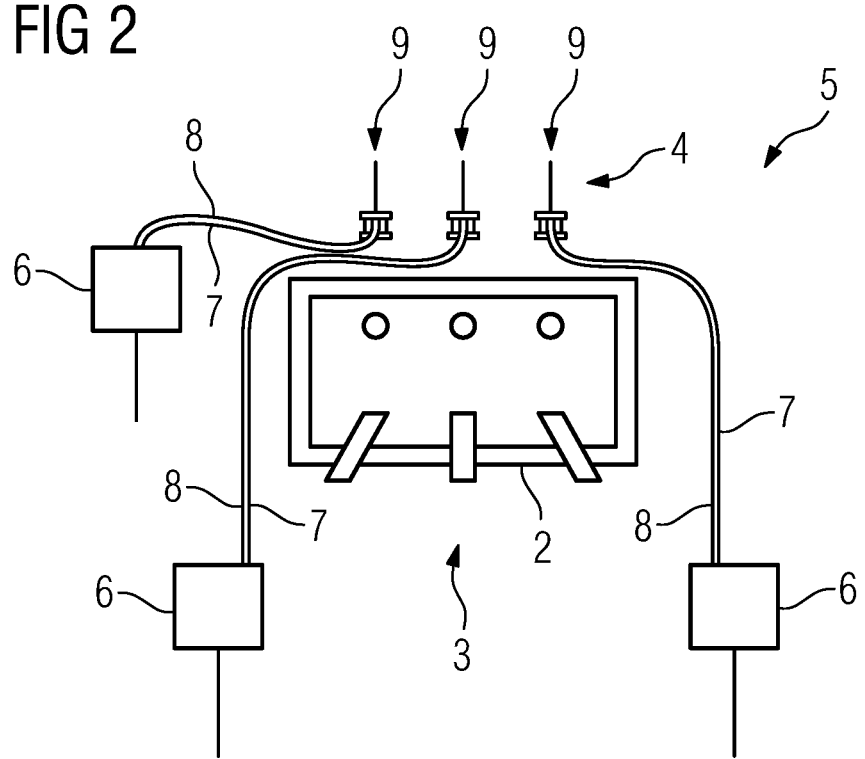
FIG. 2 shows a schematic view of an exemplary embodiment of the arrangement according to the invention as a replacement of the faulty multi-phase transformer according to FIG. 1.

FIG. 2 shows a schematic view of the use of the arrangement 5 according to the invention to replace the multi-phase transformer 1. It is apparent that the arrangement 5 is composed of a plurality of single phase transformers 6. In each single phase transformer 6, the voltage of the low-voltage winding is applied to a cable connection (not illustrated figuratively here) of the housing of each single phase transformer 6. In this context, each cable connection is connected via two cable conductors 7 and 8 as a cable line to, in each case, one outdoor connection 9. Each outdoor connection 9 is in turn connected to a phase of the consumer power system 4. Owing to the cable connection or cable line with two cable conductors 7, 8 between the outdoor connection 9 and the cable connection of each single phase transformer 6, the outdoor connections 9 can be set up, for example, in the vicinity of the old multiphase and faulty transformer 1, with the result that the power system phases do not have to be expensively newly laid in order to be connected to a replacement transformer. The cable conductors 7, 8, together with the outdoor connections 9, therefore permit the single phase replacement transformers 6 to be set up in a flexible way until a newly fabricated new transformer takes the place of the faulty transformer 1.

Figure 3:
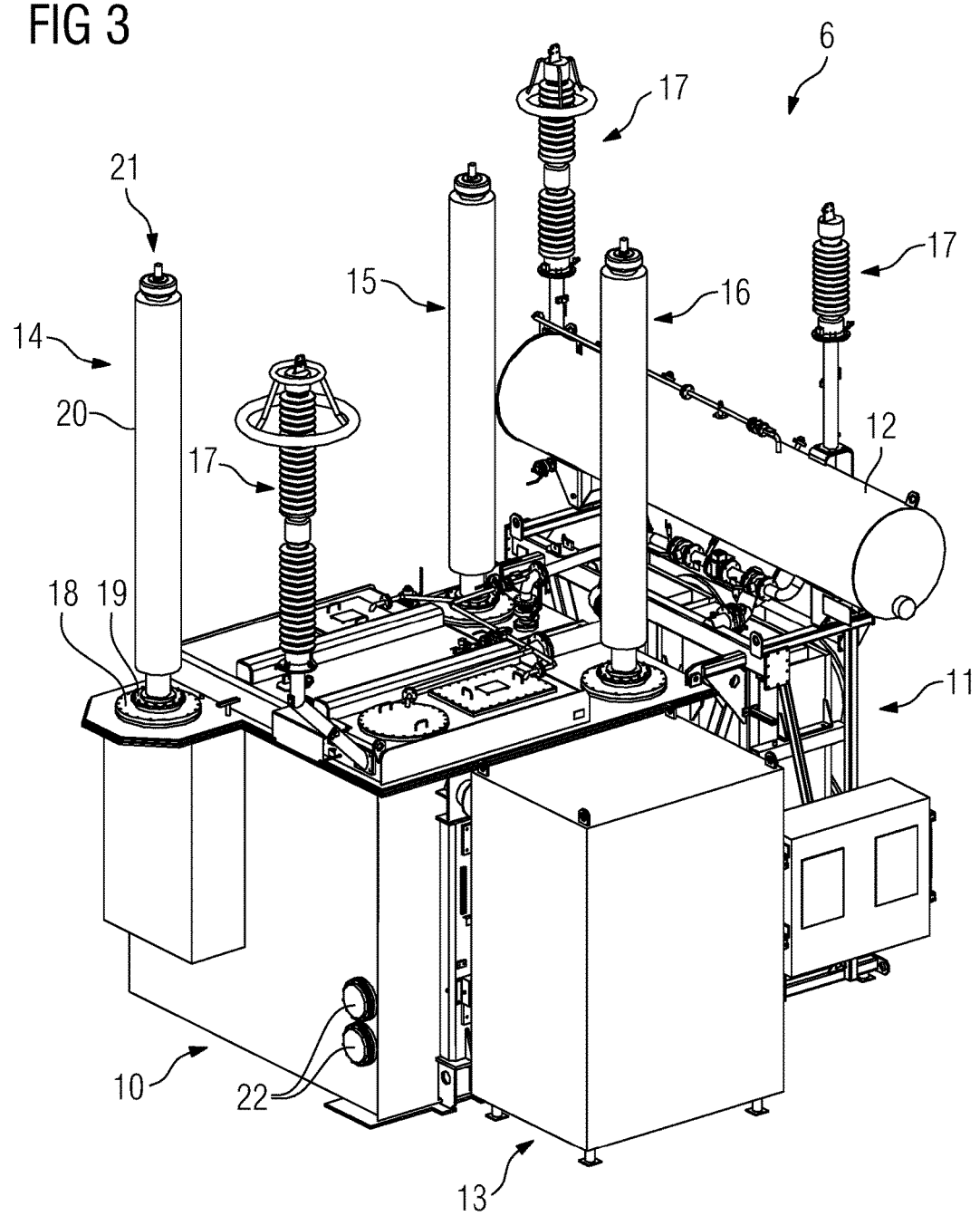
FIG. 3 shows a perspective view of an exemplary embodiment of a single phase transformer for an arrangement according to the invention.

FIG. 3 shows a perspective view of an exemplary embodiment of a single phase transformer 6 of an arrangement 5 according to the invention. The single phase transformer 6 shown there has a housing 10 which is equipped with a cooling module 11, an expansion vessel 12, an auxiliary power module 13 and high-voltage leadthroughs 14, 15 and 16. The specified components or modules are detachably connected to one another, and can therefore be easily disassembled and transported independently of one another. In order to protect the high-voltage leadthroughs 14, 15 and 16 and the windings of the transformer 6 which are arranged in the housing 10, overvoltage arresters 17 are used which have a nonlinear resistance within their arrester housing, said nonlinear resistance changing, in the case of overvoltage, from a nonconductive state into a conductive state and therefore protecting the components which are connected in parallel with it.

The high-voltage leadthroughs 14, 15 and 16 are each embodied as plug-in high-voltage leadthroughs and can be introduced with their plug-in end into their suitable lead through plug-in bushings 18. The lead through plug-in bushings 18 are of rotationally symmetrical design and bound a cavity which is located in an open fashion with respect to the housing cover but is closed on one side, and is embodied with a shape which is complementary to the plug-in end of the respective high-voltage lead through 14, 15 and 16. The lead through plug-in bushings 18 are also connected in a fluid-tight fashion to the housing 10, with the result that the interior of the single phase transformer 6 is closed off hermetically, that is to say in an air-tight and fluid-tight fashion, from the external atmosphere. At the closed ends of each lead through plug-in bushing 18 a line bolt (which is not represented figuratively) is held, said line bolt being in conductive contact with the high-voltage conductor extending through the respective high-voltage lead through when the high-voltage lead through 14, 15 or 16 is inserted into the respective lead through plug-in bushing 18. The said line bolt extends into the interior of the housing 10, that is to say into the oil space thereof, where it is in contact with a winding connection line which therefore connects the lead through plug-in bushing 18 electrically to the respective high-voltage winding or low-voltage winding of the transformer 6. In order to mount and secure the high-voltage leadthroughs 14, 15 or 16, they each have an attachment connection 19. A pillar section 20 extends from the attachment connection 19 to a high-voltage connection 21. The distance between the attachment connection 21 and the high-voltage connection 21 is 3 meters in the exemplary embodiment shown. According to the invention, each pillar section 20 advantageously has a length of between 3 and 5 meters.

In FIG. 3 it is also apparent that the housing 10 has two cable connections 22 in addition to the high-voltage leadthroughs 14, 15 and 16. In the exemplary embodiment shown in FIG. 3, the cable connections 22 and the high-voltage lead through 16 can be connected to the low-voltage winding, while the high-voltage leadthroughs 14 and 15 can be optionally connected to the high-voltage winding.

Figure 4:
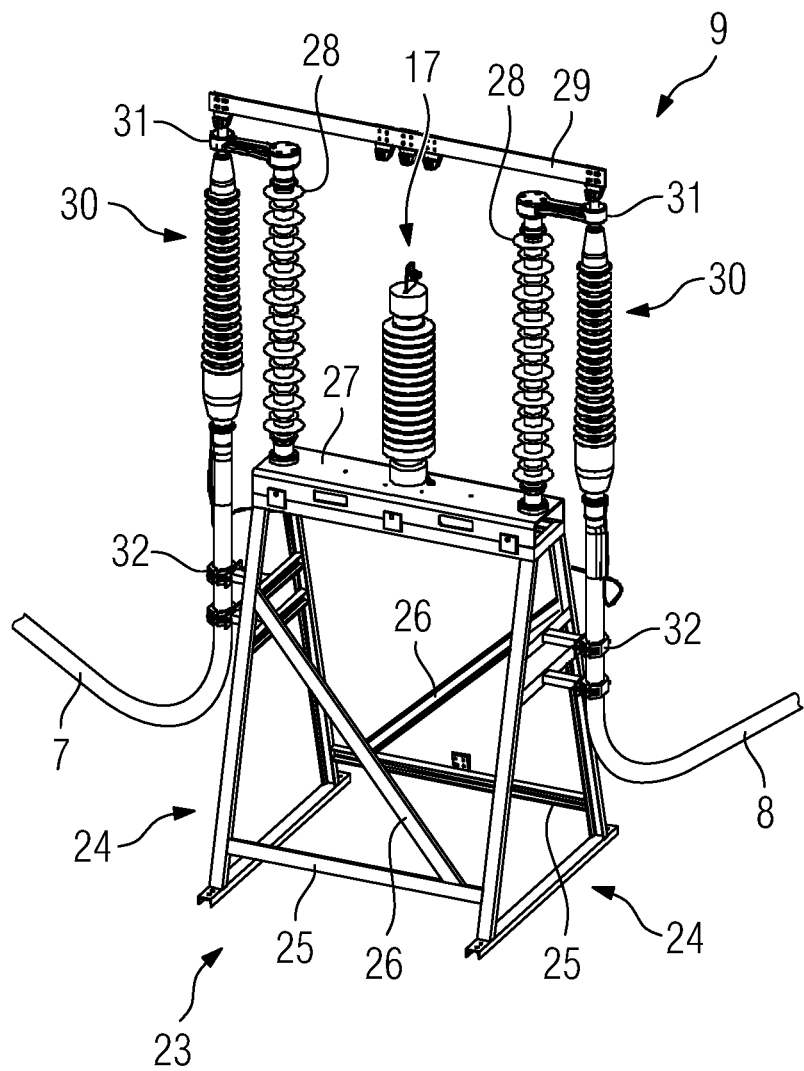
FIG. 4 shows a perspective view of an outdoor connection.

FIG. 4 shows an outdoor connection 9 in a perspective illustration by way of example of the other outdoor connections 9 which are of identical design. The outdoor connection 9 has an under frame 23 which is composed of two lateral triangular stands 24 which are connected rigidly to one another via longitudinal carriers 25 and lateral reinforcements 26. In the upper region, a dead plate 27 extends between the two triangular stands 24. Two supports 28 are provided for holding a busbar 29, which extends over half the dead plate 27 and parallel thereto. The supports 28 extend in a longitudinal direction and each have a metallic connection at their ends. The two connections of a support are connected to one another in an electrically insulated fashion via a pillar-shaped insulated section having external fins. In addition, FIG. 4 shows the two cable conductors 7 and 8 which extend with their cable ends 30 to a connection point 31 on the outdoor connection 9, with the result that a conductive contact is made available between the conductor extending in the interior of the respective cable conductor 7 or 8 and the busbar 26. In this context, the cable ends 30 have, like the supports 28, external fins with which the creepage path for fault currents is increased. In order to hold the cable ends 30 in parallel with the supports 28, cable holders 32 are attached to the under frame 23 and have at their free end facing away from the holding frame 23 annular holding rings through which the respective cable conductor 7 or 8 extends. The cable end 30 is screwed to the busbar 29 at the connection point 31. Furthermore, an overvoltage arrester 17 can be connected between the busbar 29 and the under frame 23 which is at ground potential.

Figure 5:
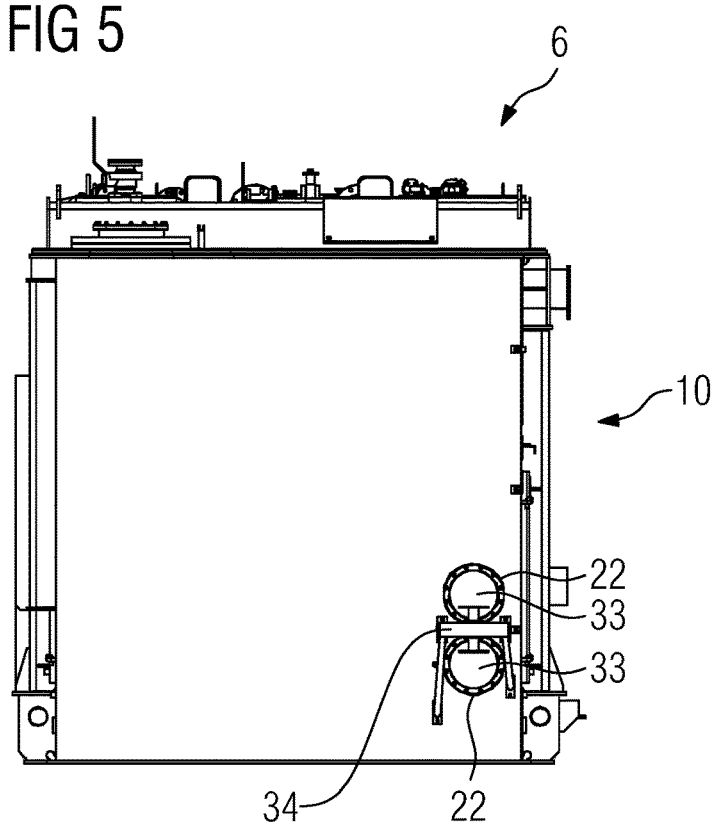
FIG. 5 shows a side view of the housing of an exemplary single phase transformer.

FIG. 5 shows an exemplary housing 10 of a single phase transformer 6 of the arrangement 5 according to the invention in a side view. In this view, the two cable connections 22 can be seen particularly well. In particular, it is apparent that each cable connection 22 is protected against dirt and moisture by a cable connection cover 33. A cable connection mount 34 can be seen between the cable connections 22.

Figure 6:
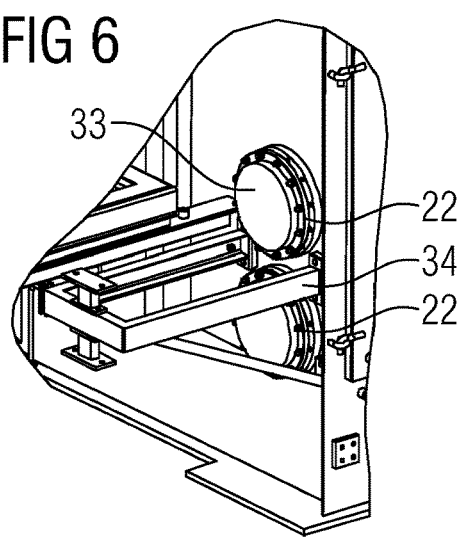
FIG. 6 shows a cable connection of the housing according to FIG. 5 in an enlarged view.

FIG. 6 shows the cable connections 22 more precisely. In particular, it is apparent that they have an external thread through which a cable end of a cable conductor can be connected in a positively locking fashion to the cable connection 22. Furthermore, it is apparent that the cable connection mount 34 extends forward between the cable connections 22, that is to say counter to the plug-in direction of the cable conductors 7, 8.

Figure 7:
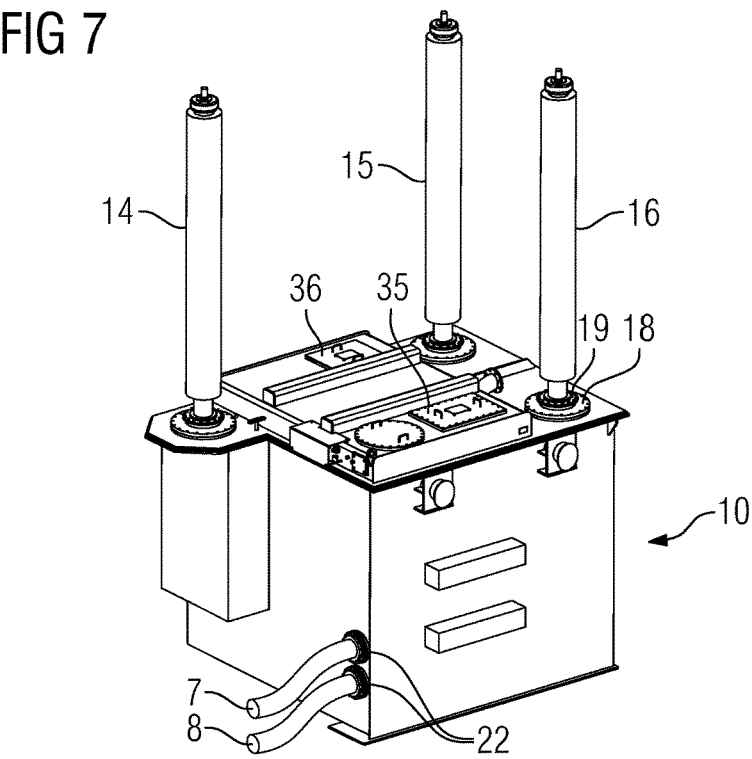
FIG. 7 shows a perspective view of an exemplary embodiment of a housing with plug-in leadthroughs.

FIG. 7 shows the housing 10 and the high-voltage leadthroughs 14, 15 and 16 and the cable conductors 7 and 8 which are connected to the cable connections 22. FIG. 7 shows by way of example all the connection possibilities of the single phase transformer 6, wherein the high-voltage lead through 14 is configured for input voltages of 345 kV, the high-voltage lead through 15 for an input voltage of 230 kV, and the high-voltage lead through 16 for output voltages of 138 or 115 kV, depending on the position of a stepping switch (not illustrated figuratively). The cable connections 22 and the cable conductors 7 and 8 are also configured for voltages in the region of 138 or 115 kV.

FIGS. 7, 8, 9 and 10 illustrate the flexibility of the arrangement according to the invention and also show, in particular, the fact that the arrangement 5 can be used in a variable way at different voltage levels. FIG. 7 illustrates the housing with all the plug-in high-voltage leadthroughs 14, 15, 16, as shown in FIG. 1. Furthermore, a redundantly designed cable connection 22 is shown. In addition, it is apparent that the housing 10 has an output adjustment opening 35 and an input adjustment opening 36 which can each be closed off in a fluid-tight fashion by a cover or by a flap.

Figure 8:
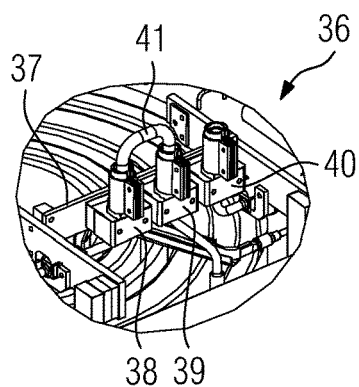
FIGS. 8, 9 and 10 show adjustment openings for selecting the inputs and outputs in a schematic view.

FIG. 8 shows the view into the input adjustment opening 36 and a selection device 37 facing the latter can therefore be seen. The selection device 37 has voltage connections 38, 39 and 40. Two of the voltage connections 38 and 39 are connected to one another using a U-shaped actuating conductor or switching unit 41. As a result of this adjustment, the high-voltage winding of the single phase transformer 6 is connected to the lead through plug-in bushing 10 of the high-voltage lead through 14. The transformer 6 is therefore made more resilient for an input voltage of 345 kV. The output of a voltage of, for example, 138 kV occurs at the high-voltage lead through 16. The high-voltage lead through 15 can be dispensed with in this mode of operation.

Figure 9:
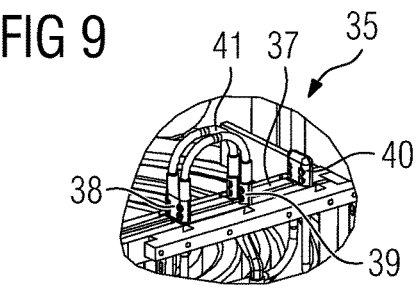
Figure 10:
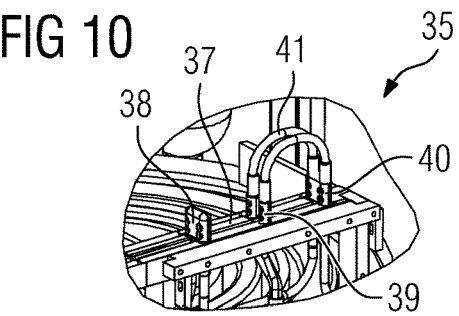
Figure 11:
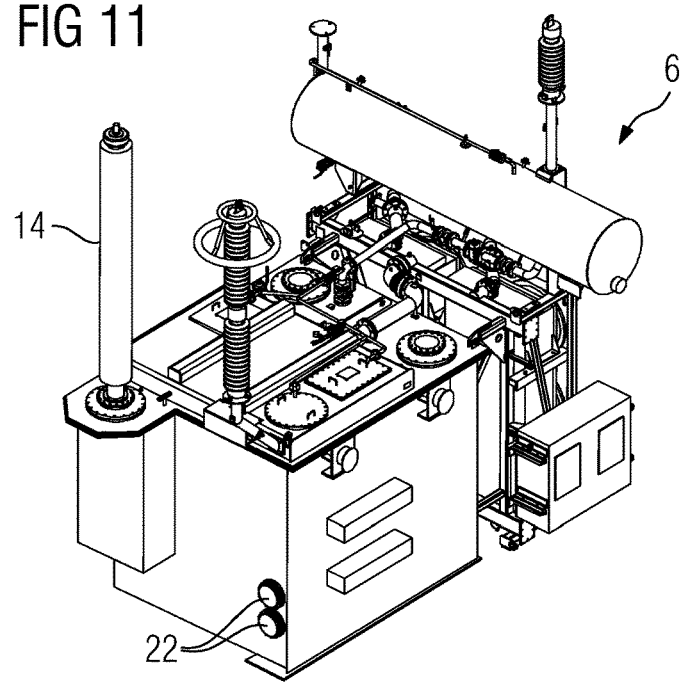
FIGS. 11 and 12 show the configuration of a single phase transformer with a plug-in lead through for different inputs and outputs.

FIGS. 9 and 10 show a view into the output adjustment opening 35, wherein in turn a selection device 37 can be seen with its three voltage connections 38, 39 and 40. In FIG. 9, the connection conductor or switching unit 41 connects the voltage connections 38 and 39, and the voltage is therefore output at the high-voltage lead through 16, as described above. FIG. 10 also shows the output adjustment opening 34, but the connections 39 and 40 are connected by the connecting conductor or switching unit 41. In this setting, the low-voltage winding is connected on the output side to the two cable connections 22, and the high-voltage lead-throughs 15 and 16 can therefore be dispensed with. This configuration or setting of the single phase transformer 6 is shown in a perspective illustration in FIG. 11.

Figure 12:
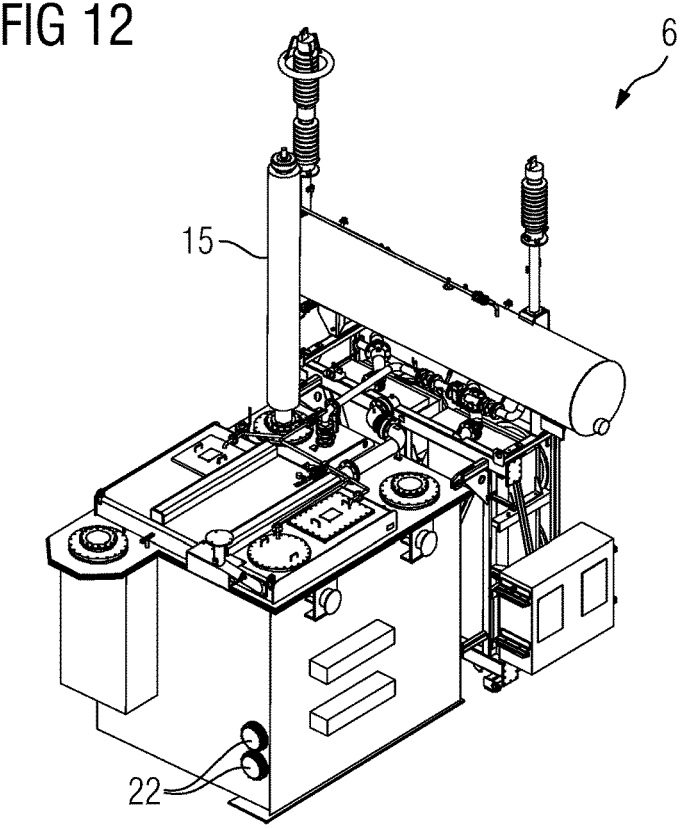

FIG. 12 shows a setting in which the high voltage is 230 kV, and the high-voltage lead through 15 is therefore used instead of the high-voltage lead through 14. For this purpose, the actuation conductor or switching unit 41 connects the voltage connections 39 and 40 which face the input adjustment opening 36.

The invention claimed is:

1. A configuration for replacing a multi-phase transformer, the configuration comprising:
   a plurality of single phase transformers each having a respective housing being filled with an insulating fluid;
   a plurality of outdoor connections each being set up separately from a respective one of said housings;
   each of said housings having a respective core with a respective high-voltage winding and a respective low-voltage winding disposed therein;
   each of said housings having at least one cable connection;
   cable lines each connecting a respective one of said cable connections to a respective one of said outdoor connections, each of said cable lines having a respective cable end; and
   each of said outdoor connections including:
      an underframe for placing said outdoor connection on the ground, said underframe including a dead plate;
      a busbar for connection to a phase of a consumer network or supply network, said busbar being connected to said cable ends;
      at least one support supporting said busbar in an insulated manner on said underframe;
      an overvoltage arrester connected between said busbar and said underframe;
      said supports and said overvoltage arrester being connected to said dead plate.

2. The configuration according to claim 1, wherein said cable lines each have at least one cable conductor, and each cable conductor has a length of between 5 and 50 meters.

3. The configuration according to claim 1, wherein each respective one of said housings is equipped with two cable connections, and said cable lines each include two cable conductors.

4. The configuration according to claim 3, wherein each of said outdoor connections has two cable inputs.

5. The configuration according to claim 1, wherein each of said housings includes:
   a selection device disposed in said housing, said selection device having a plurality of voltage connections each being connected to said high-voltage winding or said low-voltage winding;
   a switching unit for selectively interconnecting two of said voltage connections; and
   at least one closable adjustment opening formed in said housing and providing access to said selection device.

6. The configuration according to claim 5, which further comprises:
   lead through plug-in bushings;
   said at least one closable adjustment opening including an input adjustment opening and an output adjustment opening;
   said selection device being one of two said selection devices;
   one of said selection devices facing said input adjustment opening and being connected to said high-voltage winding and to at least two of said lead through plug-in bushings; and
   the other of said selection devices facing said output adjustment opening and being connected to said low-voltage winding, to at least one of said lead through plug-in bushings or to said at least one cable connection.

7. The configuration according to claim 1, which further comprises:
   a cooling module to be set up separately,
   a separately set-up expansion vessel,
   plug-in high-voltage lead throughs, and
   an auxiliary power module,
   each being detachably connected to a respective one of said housings.

8. The configuration according to claim 1, wherein said cable connections are plug-in connections for said cable lines.

9. The configuration according to claim 1, wherein said underframe is a A-frame and cable holders connect said cable ends to said A-frame.

10. The configuration according to claim 1, wherein said supports, said cable ends and said overvoltage arrester are substantially mutually parallel and substantially perpendicular to said busbar and to said dead plate.

* * * * *